(No Model.)
W. E. BUDD.
PNEUMATIC GRAIN CONVEYER.
No. 366,919.     Patented July 19, 1887.
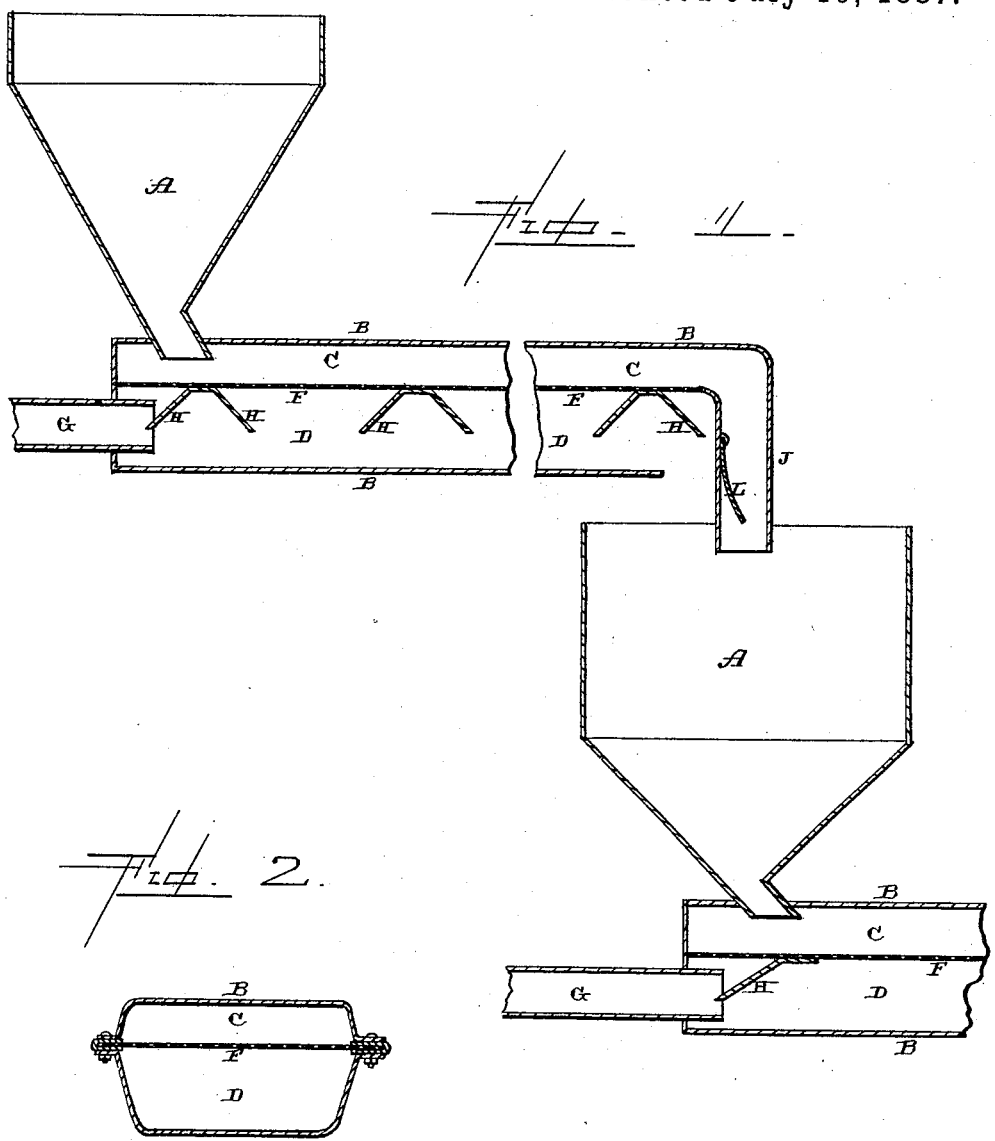

UNITED STATES PATENT OFFICE.

WILLIAM E. BUDD, OF CHATHAM, NEW JERSEY.

PNEUMATIC GRAIN-CONVEYER.

SPECIFICATION forming part of Letters Patent No. 366,919, dated July 19, 1887.

Application filed March 15, 1887. Serial No. 231,051. (No model.)

*To all whom it may concern:*

Be it known that I, WILLIAM E. BUDD, of Chatham, in the county of Morris and State of New Jersey, have invented certain new and useful Improvements in Pneumatic Grain-Conveyers; and I do hereby declare the following to be a full, clear, and exact description of the invention, such as will enable others skilled in the art to which it pertains to make and use it, reference being had to the accompanying drawings, which form part of this specification.

My invention relates to an improvement in pneumatic grain-conveyers; and it consists in the combination of the hopper or hoppers and a tube or conveyer through which the current of air is forced, the tube being provided with a perforated partition, through which the air passes, so as to float the grain, and with deflectors which catch the air and deflect it upward through the partition, as will be more fully described hereinafter.

The object of my invention is to place a perforated partition in the tube, through which the grain is conveyed by the current of air, and thus have the air pass up under the grain and float or convey it along over the top of the partition, in contradistinction to having the air forced directly into the tube into which the grain is discharged.

Figure 1 is a vertical longitudinal section of a conveyer embodying my invention. Fig. 2 is a vertical cross-section taken through the conveyer-pipe.

A represents the hopper, of which there may be any desired number, according to the distance that the grain is to be conveyed, and each succeeding one will be placed upon a lower level, as shown, so that the grain can be conveniently gathered at any desired point and enable fresh currents of air to be introduced into the pipe which conveys the current. Each hopper A has connected to its lower end a conveyer pipe or channel, B, which may either be of the shape shown in Fig. 2 or any other that may be preferred. This conveyer is divided horizontally into two compartments, C D, by means of a perforated partition, F, which may be made of finely-perforated sheet metal, wire, or any other suitable material, the perforations being too small to allow the grain which is being conveyed to pass through them. As the grain passes from the hopper it falls upon the top of this perforated partition F, and in no case does any of the grain pass below it into the air-channel D. Connected with one end of each air-channel D is a pipe, G, which leads from any suitable air-forcing mechanism. Secured to the under side of the perforated partition F are a number of inclined deflectors, H, which, as the air is passing through the chamber D, catches it and deflects it upward, so as to force a portion of it to pass through the partition F. As the grain rests upon or is passing over the top of this partition F the air rises up through the partition under it and floats or conveys the grain along through the chamber C toward the next hopper A.

Where the grain falls into a pipe or tube through which the air is passing, the grain settles upon the bottom of the tube, and then the greater portion of the air rises in the top of the pipe or tube and passes along over the top of the grain without doing any effective work. In order to overcome this defect, the perforated partition and the deflectors are used, so as to cause the air to pass upward under the grain, and by forcing upward against its under side lessen its frictional contact upon the surface of the grain, and thus enable the grain to be moved much more readily and easily than would otherwise be the case. Just before another hopper A is reached an opening is made through the compartment or chamber D, or the chamber may stop entirely, so as to allow the air therein to escape; but the chamber C continues on and is formed into a pipe or conductor, through which the grain passes to the hopper A. In this short pipe or conductor J is placed a valve, L, by means of which the flow of grain can be stopped whenever so desired.

A fresh current of air will be introduced through a pipe G at each hopper, so as to give the grain a fresh impulse and continue its movement to any desired distance. The distance between the hoppers and the length of the conveyers B may be varied at will. The stronger the blast or current of air the greater the distance may be between them and the greater the distance the grain may be conveyed.

The valve L also acts as a safeguard against the reaction of air from the next conveyer.

The air-deflectors H in the conveyer are shown extending in opposite directions, so that they will catch the air equally as well, no matter in what direction it is being forced. When the air is forced in one direction, one set of deflectors only will catch it and deflect it upward through the partition F, and when it is forced in the opposite direction the other set of deflectors is brought into play.

I do not restrict myself to any particular construction of conveyer; but it will preferably be made of flanged sections, which are bolted together at their edges, as shown in Fig. 2, and these sections will be made to alternate, so as to break joints. A suitable packing will be placed around the edges of the perforated partition where they are held between the flanges of the different sections, and thus form a tight joint to prevent the escape of air. Valves may also be located in the conveyer at any desired point for the purpose of stopping the flow of grain at points distant from the starting-place, and a safety or escape valve may also be applied to the conveyer at or near the point where the air enters, so as to provide against an overpressure.

The conveyer may be supported upon suitable supports provided therefor, or it may be suspended by means of wire or a cable.

Having thus described my invention, I claim—

1. The combination, in a grain-conveyer, of a pipe or channel which is divided horizontally by a perforated partition, upon which the grain falls, with an air pipe or channel below the partition, whereby a current of air introduced into the pipe or channel below the partition moves the grain along over its top, substantially as shown.

2. The combination of the conveyer B, a perforated partition placed therein and extending horizontally across, the deflectors secured to the under side of the partition, the hoppers, and the tube G, through which the air is conveyed, substantially as described.

3. The combination of the hoppers placed any suitable distance apart, the conveyer B, extending from one to the other, the perforated partition placed therein, the deflectors H, secured to the under side of the partition, the pipe G, through which the air is conveyed, the pipe J at the end of the conveyer, and the valve L, placed therein, substantially as set forth.

In testimony whereof I affix my signature in presence of two witnesses.

WILLIAM E. BUDD.

Witnesses:
PORTER B. COOLIDGE,
R. M. SKILTON.